US008991227B2

(12) United States Patent
Muller et al.

(10) Patent No.: US 8,991,227 B2
(45) **Date of Patent: *Mar. 31, 2015**

(54) FLUSH HANDLE DEVICE FOR A DOOR OF A VEHICLE

(75) Inventors: Dirk Muller, Essen (DE); Mario Christensen, Mulheim (DE); Stefan Monig, Schwelm (DE); Cristof Brauner, Essen (DE); Martin Witte, Ahaus (DE); Norbert Heller, Viersen (DE)

(73) Assignee: Huf Hulsbeck & Furst GmbH & Co., Velbert (DE)

(*) Notice: Subject to any disclaimer, the term of this patent is extended or adjusted under 35 U.S.C. 154(b) by 347 days.

This patent is subject to a terminal disclaimer.

(21) Appl. No.: 13/502,694

(22) PCT Filed: Sep. 18, 2010

(86) PCT No.: PCT/DE2010/001111

§ 371 (c)(1),
(2), (4) Date: Jun. 19, 2012

(87) PCT Pub. No.: WO2011/047651

PCT Pub. Date: Apr. 28, 2011

(65) Prior Publication Data

US 2012/0247161 A1 Oct. 4, 2012

(30) Foreign Application Priority Data

Oct. 20, 2009 (DE) ........................ 10 2009 045 873

(51) Int. Cl.
*B60R 25/02* (2013.01)
*E05B 85/10* (2014.01)

(52) U.S. Cl.
CPC ............ *E05B 85/107* (2013.01); *E05B 85/103* (2013.01); *Y10S 70/31* (2013.01); *Y10S 292/31* (2013.01)
USPC .................. 70/208; 70/210; 70/423; 70/455; 70/DIG. 31; 292/336.3; 292/DIG. 31

(58) Field of Classification Search
CPC ..... E05B 85/103; E05B 13/002; E05B 83/36; E05B 85/16; E05B 5/00; E05B 79/06; E05B 17/2034; E05B 85/14; E05B 85/10; E05B 17/183; E05B 47/0688; E05B 7/00; E05B 47/0657; E05B 47/0673; E05B 77/04
USPC .................... 70/208, 210, 224, 237, DIG. 31; 292/336.3, DIG. 31, DIG. 30
See application file for complete search history.

(56) References Cited

U.S. PATENT DOCUMENTS 2,131,033 A * 9/1938 Barrington et al. ............ 70/208
2,213,814 A * 9/1940 Jacobi ............................ 70/455

(Continued)

FOREIGN PATENT DOCUMENTS

DE 196 30 997 A1 2/1998
DE 197 31 325 A1 1/1999

(Continued)

OTHER PUBLICATIONS

International Search Report under date of Jan. 20, 2011, in connection with PCT/DE2010/001111.

*Primary Examiner* — Suzanne Barrett
(74) *Attorney, Agent, or Firm* — Quarles & Brady LLP

(57) ABSTRACT

The invention relates to a handle device (1) for a lock unit of a vehicle, comprising a handle part (10) which is movably mounted relative to a door (11) of the vehicle and which can be displaced between a rest position and an operating position, the handle part (10) being flush with the exterior of the door (11) in the rest position and projecting from the exterior of the door (11) in the operating position. The handle part (10) can be manually actuated to open the door (11) when in the operating position. An actuating unit (12) is used to transfer the handle part (10) at least from the rest position to the operating position. According to the invention, the handle device further comprises a lock cylinder (14) which is arranged in the handle device (1) such that the actuating unit (12) covers the lock cylinder (14) towards the exterior of the door (11) and at least partially releases the lock cylinder (14) when manually actuated.

18 Claims, 4 Drawing Sheets

(56) References Cited

U.S. PATENT DOCUMENTS

Figure 1:
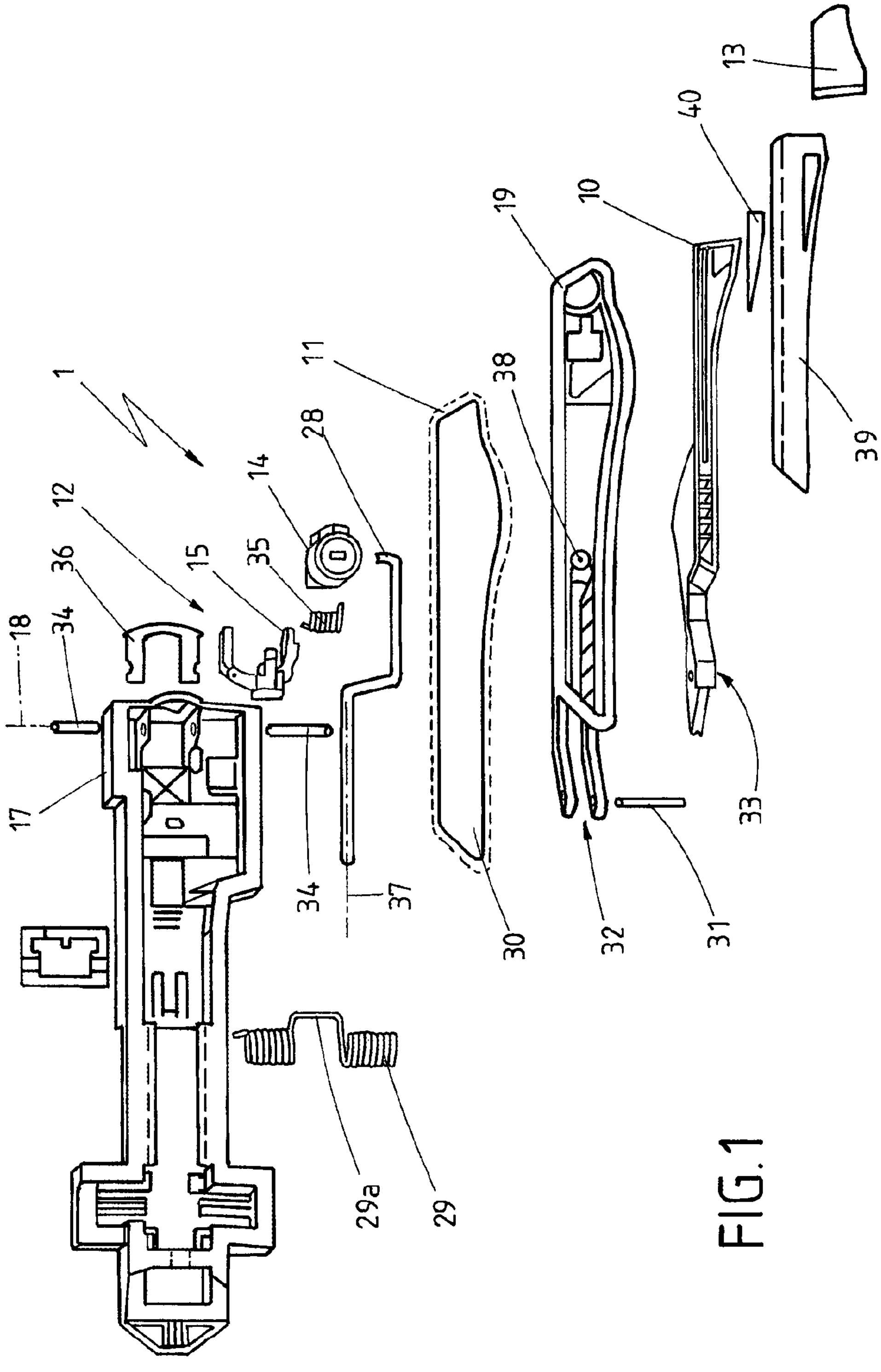

| | | | | |
|---|---|---|---|---|
| 3,153,553 | A * | 10/1964 | Sandor | 292/336.3 |
| 3,528,695 | A * | 9/1970 | Peters | 292/336.3 |
| 3,544,148 | A * | 12/1970 | Sandor | 292/336.3 |
| 4,706,478 | A * | 11/1987 | Swan et al. | 70/28 |
| 5,852,943 | A * | 12/1998 | Dutka et al. | 70/237 |
| 5,904,385 | A * | 5/1999 | Linder | 292/336.3 |
| 6,427,502 | B1 * | 8/2002 | Zagoroff | 70/208 |
| 6,644,074 | B2 * | 11/2003 | Monig | 70/208 |
| 6,696,652 | B1 * | 2/2004 | Spies | 200/61.62 |
| 6,698,262 | B2 * | 3/2004 | Wittwer | 70/208 |
| 7,013,689 | B2 * | 3/2006 | Graham et al. | 70/208 |
| 7,269,984 | B2 * | 9/2007 | Jackson | 70/210 |
| 7,364,211 | B2 * | 4/2008 | Niskanen et al. | 292/336.3 |
| 7,526,936 | B2 * | 5/2009 | Niskanen et al. | 70/423 |
| 7,530,610 | B2 * | 5/2009 | Tanimoto et al. | 292/336.3 |
| 7,543,863 | B2 * | 6/2009 | Herbert et al. | 292/336.3 |
| 7,779,659 | B2 * | 8/2010 | Tanimoto et al. | 70/210 |
| 8,146,393 | B2 * | 4/2012 | Katagiri et al. | 70/208 |
| 2004/0144142 | A1 * | 7/2004 | Dimig et al. | 70/208 |
| 2008/0190157 | A1 * | 8/2008 | Mizuno | 70/455 |
| 2014/0000167 | A1 * | 1/2014 | Patel et al. | 49/32 |
| 2014/0047877 | A1 * | 2/2014 | Bohm et al. | 70/275 |

FOREIGN PATENT DOCUMENTS

| | | | |
|---|---|---|---|
| DE | 198 27 132 | B4 | 12/1999 |
| DE | 10 2004 036663 | A1 | 3/2006 |
| DE | 10 2005 036663 | A1 | 3/2006 |
| DE | 10 2006 060540 | A1 | 6/2008 |
| EP | 0 822 306 | A2 | 2/1998 |
| FR | 979 715 | A | 5/1951 |
| WO | 01/75252 | A1 | 10/2001 |

* cited by examiner

FLUSH HANDLE DEVICE FOR A DOOR OF A VEHICLE

CROSS-REFERENCE TO RELATED APPLICATIONS

This application claims priority to PCT International Application No. PCT/DE2010/001111 filed on Sep. 18, 2010, which claims priority to German Patent Application No. 10 2009 045 873.5 filed on Oct. 20, 2009, both of which are fully incorporated by reference herein.

The present invention relates to a handle device of a locking device of a vehicle, with a handle part which is mounted movably with respect to a door of the vehicle and is movable between a rest position and an operating position, wherein, in the rest position, the handle part is arranged flush with the outer side of the door and, in the operating position, protrudes out of the outer side of the door in the manner of a projection, wherein the handle part can be operated manually in the operating position in order to open the door, and wherein, furthermore, an actuating unit is provided, by means of which the handle part can be transferred at least from the rest position into the operating position.

DE 10 2004 036 663 A1 discloses a generic handle device of a locking device of a vehicle. In the present case, the handle device describes the device arranged in the door of the vehicle. By contrast, the locking device comprises the entire system, and therefore the handle device constitutes part of the locking device which preferably comprises all of the handle devices on the vehicle and a central locking system and, for example, a control unit for the latter. In particular, the locking device comprises a lock which interacts with the handle device such that the handle device has to be operated manually in order to open the lock of the door, after which the door opens.

The actuating unit of the arrangement shown is designed as an unlocking button which has to be pressed in order to activate an internal mechanism which causes the handle part to project into the operating position. In this case, furthermore, a locking button has to be pressed, as a result of which the handle part is returned into the rest position. A disadvantage in this case is the button operation of the unlocking button which has to be pressed into a depression by finger pressure. Furthermore, the handle device does not have any means in order to lock or to unlock the door of the vehicle with a key. Although locking cylinders are generally known for this purpose, said locking cylinders cannot be integrated, according to the prior art, in flush handle devices of the type of interest here. At best, the locking cylinders are incorporated in the door panel of the door of the vehicle adjacent to the handle device.

It is therefore the object of the present invention to provide a flush handle device which has an extended functional scope while retaining a flush configuration of the handle device.

This object is achieved based on a handle device according to the preamble of claim 1 in conjunction with the characterizing features. Advantageous developments of the invention are indicated in the dependent claims.

The invention includes the technical teaching that a locking cylinder is provided and is arranged in the handle device in such a manner that the actuating unit conceals the locking cylinder with respect to the outer side of the door and at least partially releases the locking cylinder upon manual actuation.

The invention is based here on the concept of extending the functional scope of the handle device by advantageous integration of a locking cylinder, wherein the latter is arranged in such a manner that the flush design of the handle device for a door of a vehicle is retained. For this purpose, the unlocking button known from the prior art is no longer designed as a simple button but rather the actuating unit is actuated in a manner enabling the handle part to be transferred from the rest position into the operating position and providing covering of the locking cylinder and enabling the latter to be released if required. In the present case, the release of the locking cylinder describes at least a release of the front side, from which a key can be introduced into the locking channel of the locking cylinder. During customary operation of the handle device and in particular in the rest position of the actuating unit, the locking cylinder is concealed and is consequently not visible from the outside. If, however, the actuating unit is activated by the latter being operated manually, the locking cylinder is at least partially released. According to the invention, the actuating unit consequently serves both to activate the handle part and to cover the locking cylinder.

The actuating unit advantageously has a cover which, in the unactuated state of the actuating unit, is arranged flush with the outer side of the door and conceals the locking cylinder. The cover is arranged pivotably in the handle device in order to actuate the actuating unit, and therefore, upon manual actuation of the actuating unit, the cover pivots away laterally with respect to the locking cylinder. Consequently, the manual actuation of the actuating unit does not describe any pressing of a button into a depression but rather the cover pivots about a pivot axis and can therefore be operated advantageously. For example, in the event of individuals having relatively long fingernails, a pivoting movement of the element to be operated manually is advantageous, since pressing an unlocking button into a depression with relatively long fingernails is highly disadvantageous.

The handle device advantageously has a handle shell with an elongate extent in which, at least in the rest position, the handle part with a likewise elongate extent lies flush, the actuating unit being arranged as an extension of the elongate extent of the handle part preferably adjacent to the handle part. In particular, the handle shell can be fitted with the handle part from the outer side of the door, thus enabling production of a first installation module which can be handled and fitted individually. The handle part can be provided toward the outer side with a further cover which merges flush into an edge of the handle shell. The handle shell itself is integrated in a door opening in the door of the vehicle, wherein the edge of the handle shell ends flush with the outer surface of the door panel. Consequently, the result is a handle device in which the edge of the handle shell, the cover on the handle part and the cover of the actuating unit are each arranged flush with one another. The cover of the actuating unit is pressed or pivoted into the handle shell only in order to actuate the actuating unit, and the handle part, with the cover present on the outer side, moves from the rest position into the operating position. However, when the handle part is enclosed, the shell-shaped configuration of the handle shell is covered by the handle part or by the cover on the handle part.

Furthermore advantageously, upon actuation of the actuating unit, the cover pivots in the direction of the handle part, and therefore the cover preferably pivots under the handle part. The spacing between the handle part, in particular between the cover on the handle part and the cover on the actuating unit, is dimensioned in such a manner that, when the cover is pivoted in the direction of the handle part, there is no contact of the cover with the handle part. In the process, the cover at least partially pivots under the handle part, and therefore said cover does not have to be pressed vertically into the handle device, in particular vertically into the handle shell, by manual operation but rather the cover can be pivoted by manual guidance about the pivot axis which is incorporated on the inside of the handle mount.

The actuating unit advantageously has an actuating element with which the actuating unit can be pivoted about the pivot axis, the cover being arranged on the actuating element. In this case, the actuating element forms the main part of the actuating unit, and the locking cylinder is accommodated in the actuating unit. The actuating element here can be of fork-shaped design, and the locking cylinder is arranged between the forks of the actuating element.

Furthermore, it is advantageous if a blocking element is provided, the blocking element being operatively connected to the actuating unit in such a manner that the blocking element is movable between a locking position and a release position by the actuating unit, the blocking element always adopting a locking position and being transferred into a release position only for the movement of the handle part from the rest position. In this case, the blocking element is activated by manual operation of the cover and consequently movement of the actuating element, and therefore the actuating unit constitutes a drive for activating the blocking element.

Said drive can be expanded by an electromechanical functional unit, and therefore the activation can also be actuated electrically and controlled electronically. The blocking element is preferably designed as a blocking rod or as a blocking wire and executes a movement on a movement axis. The blocking element here serves both to unblock and to deploy the handle part from the rest position into the operating position. At the same time, the blocking element forms a crash interlock, and therefore the blocking element prevents the handle part from being able to pass from the rest position into the operating position if acceleration forces act on the handle part.

For example, in the event of an accident, an acceleration force may act on the handle part, the acceleration force sufficing to transfer the latter from the rest position into the operating position. By means of the arrangement of the blocking element, preferably in such a manner that a form-fitting connection is produced between the handle part and the handle mount, the handle part can be transferred into the operating position exclusively when the actuating element of the actuating unit is activated. In this case, the activation takes place only by pivoting of the actuating element about the pivot axis, since acceleration forces mainly acting linearly cannot enable activation of the actuating unit. Only by manual actuation of the actuating unit is the form-fitting connection between the handle part and the handle mount released, owing to a movement of the blocking element in the direction of the movement axis, and therefore only then can the handle part also be moved out of the handle shell. As a result, a permanent crash interlock is produced for the handle part, said crash interlock being released exclusively when the actuating unit is activated for manual operation.

Furthermore, advantageously, movement of the handle part is permitted in the release position of the blocking element, movement of the handle part being blocked in the locking position, and the blocking element, in particular, preventing an unintentional opening of the door if acceleration forces act on the handle part. In the locking position, the blocking element adopts a first position and engages in a form-fitting manner in the handle part, the blocking element moving into a second position during the displacement of the blocking element into the release position, and the blocking element acting on the handle part in such a manner that the handle part moves from the rest position into the operating position. The blocking element moves in the process along a movement axis which at the same time runs approximately parallel to the elongate extent of the handle shell and consequently to the elongate extent of the handle part.

The blocking element is connected to the fork-shaped actuating element via a receiving slot, the receiving slot being displaced if the actuating element pivots about the pivot axis. The blocking element is therefore moved forward and back.

The handle device can have a handle mount which is arranged within the door, the actuating element being accommodated pivotably on the pivot axis in the handle mount. In this case, cylinder pins can be provided, the cylinder pins being guided through bores in the handle mount in order to mount the fork-shaped actuating element on the fork ends. Consequently, the actuating element can pivot about the abovementioned cylinder pins. A bearing arrangement is therefore created in the handle mount, into which the cylinder pins for the pivotable reception of the actuating element can be inserted, and therefore the pivot axis is formed by the cylinder pins and is preferably arranged in such a manner that the pivot axis runs through or at least adjacent to the locking cylinder.

The actuating element can furthermore have a receiving extension via which the cover is arranged on the actuating element, the handle device comprising a handle shell which is arranged on the outer side of the door, and the receiving extension extending through an opening in the handle shell. The handle mount can be manufactured with the actuating unit and further components, and forms a second installation module which can be handled individually as a constructional unit and can be fitted onto the door from the inner side. The first module, i.e. the handle shell with the fitted handle part and the cover on the handle part, can be prefitted from the outer side, said module being placed onto the door in the manner of a module from the outer side. The first module on the outer side of the door and the second module on the inner side of the door can then be connected to each other through the door opening. In the process, the receiving extension of the actuating element passes through the opening in the handle shell, and the cover can be fitted onto the end of the receiving extension.

Furthermore, the spring element can be provided, the spring element prestressing the actuating element in such a manner that the actuating unit always remains in an unactuated state, and therefore the cover is arranged flush with the outer side of the door and conceals the locking cylinder. Consequently, the spring element prestresses the actuating element into the position which reproduces the rest position of the actuating unit. In this case, the spring element can be arranged in such a manner that said spring element extends about at least one of the spring pins which form the mounting of the actuating element in the handle mount and by means of which the pivot axis of the actuating element is created.

The cover can advantageously be arranged releasably on the actuating element. The geometrical design of the cover and in particular the arrangement of the cover in front of the locking cylinder can be configured in such a manner that, in order to release the locking cylinder such that a key can be introduced into the latter, the cover has to be detached from the actuating element. For this purpose, the arrangement of the cover on the actuating element can have a connection which can be released by means of a tool, preferably a key, which serves at the same time to actuate the locking cylinder, and the cover can be removed from the actuating element. Since the locking cylinder, for example, only has to be opened with the key in the event of the central locking system of the vehicle malfunctioning, the removal of the cover from the actuating element can be regarded as an emergency measure which is required only when the locking cylinder actually has to be actuated with the key.

The object addressed by the present invention is furthermore achieved by a method according to the preamble of claim 18. The method relates to an actuation of a handle device 1 for a locking device of a vehicle, with a handle part which is mounted movably with respect to a door of the vehicle and is movable between a rest position and an operating position, wherein, in the rest position, the handle part is arranged flush with respect to the outer side of the door and, in the operating position, protrudes out of the outer side of the door in the manner of a projection, wherein the handle part can be operated manually in the operating position in order to open the door, and wherein, furthermore, an actuating unit is provided, by means of which the handle part is transferred at least from the rest position into the operating position. According to the invention, a locking cylinder is provided for this purpose and is arranged in the handle device in such a manner that the actuating unit conceals the locking cylinder with respect to the outer side of the door and wherein the locking cylinder is at least partially released upon manual actuation. The actuating unit can advantageously be pivoted about a pivot axis in order to transfer the handle part at least from the rest position into the operating position.

According to a further advantageous embodiment of the method, a blocking element can be provided, the blocking element being moved with the actuating unit between a locking position and a release position, the blocking element always adopting a locking position and being transferred into a release position only for the movement of the handle part from the rest position.

Figure 2:
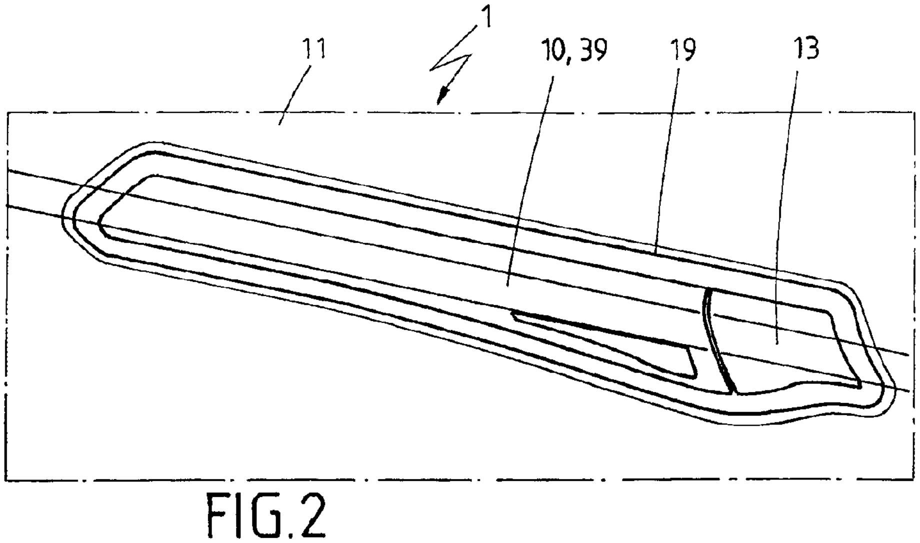
Figure 3:
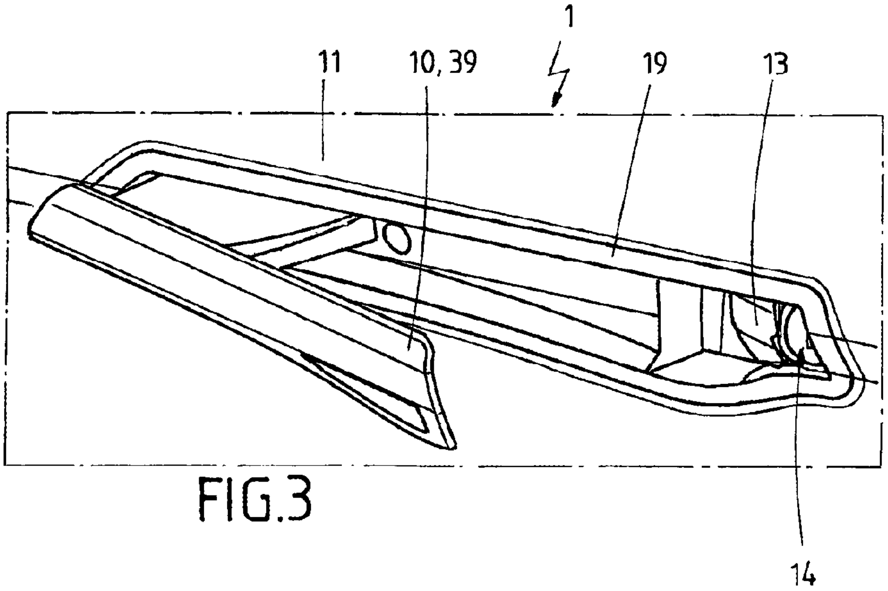
Figure 4:
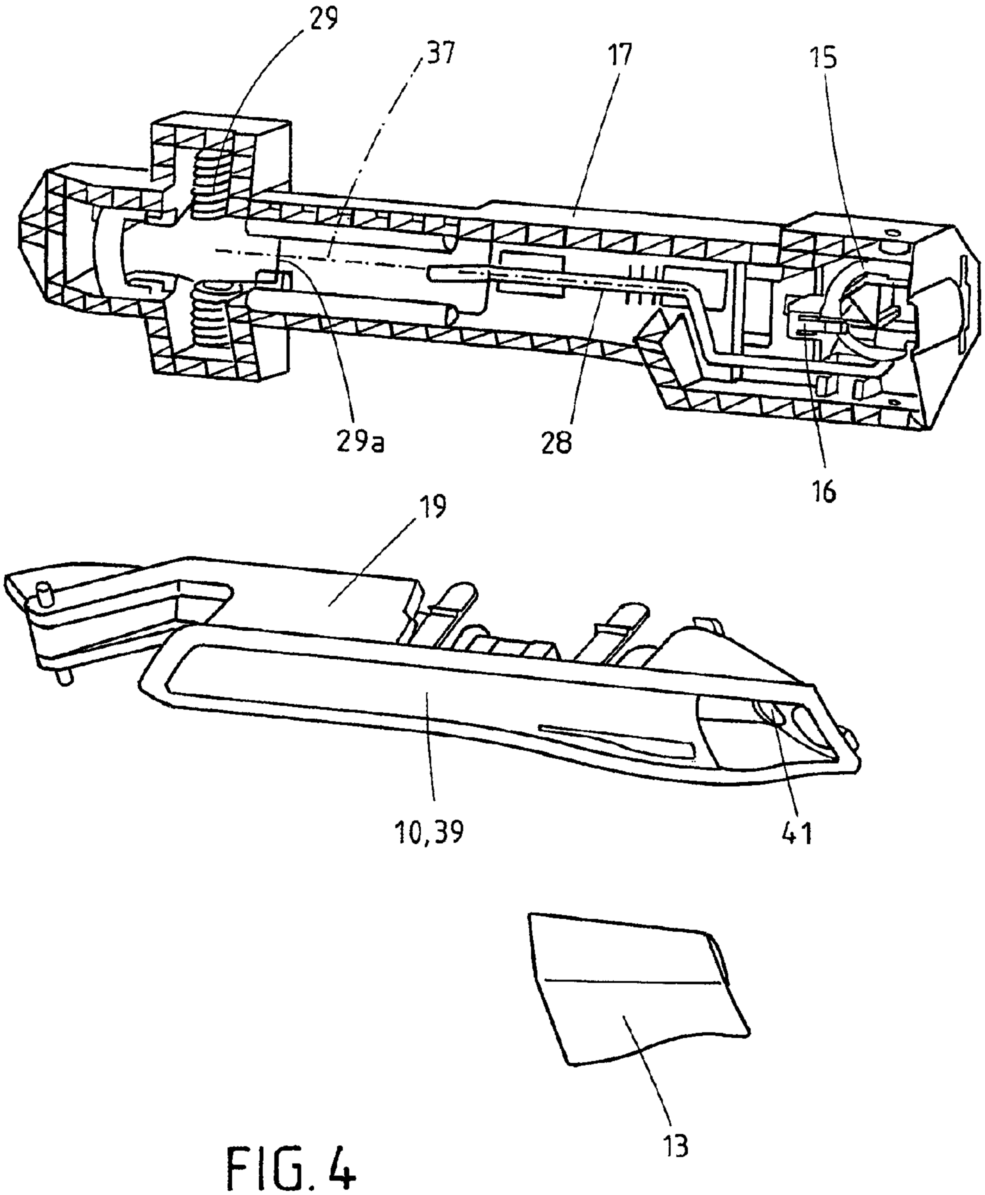
Figure 5:
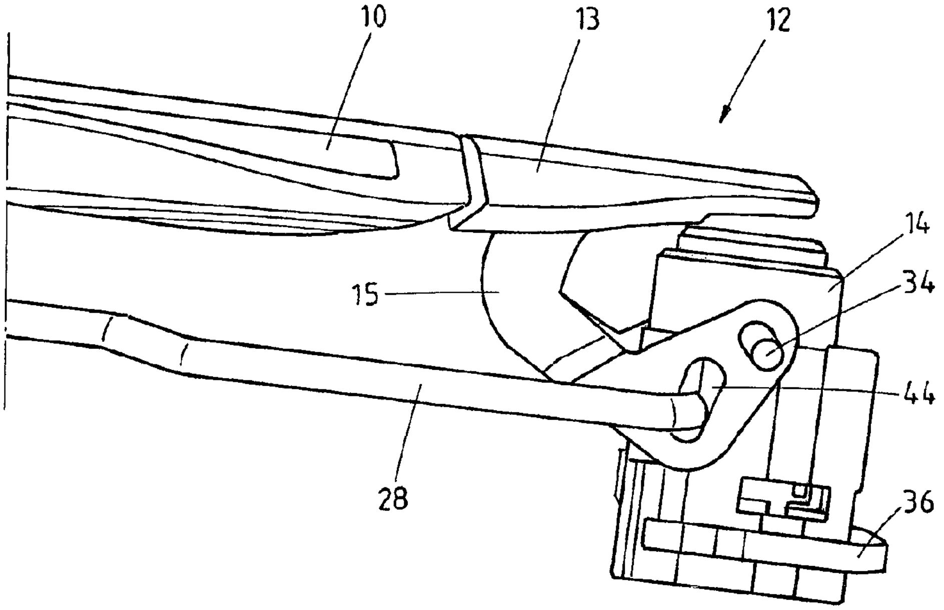
Figure 6:
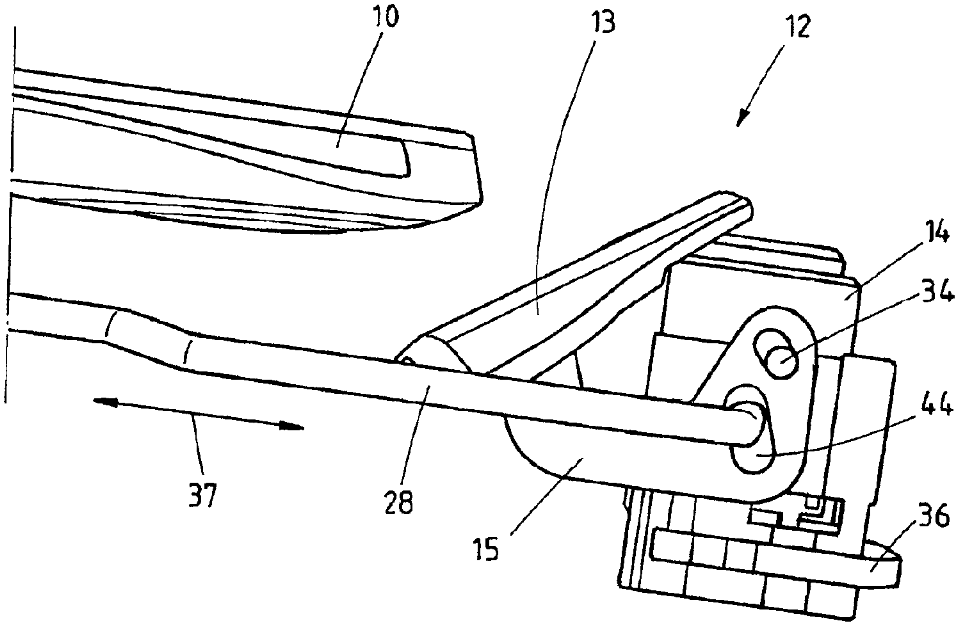

Further measures improving the invention are explained in more detail below together with the description of a preferred exemplary embodiment of the invention with reference to the figures, in which:

FIG. 1 shows an exemplary embodiment of the handle device according to the present invention in a floating arrangement, FIG. 2 shows the handle device in a flush arrangement in the door of a vehicle in a rest position, FIG. 3 shows the handle device in a flush arrangement in the door of a vehicle in an operating position, FIG. 4 shows a perspective view of the handle mount, the handle shell and the covers, FIG. 5 shows a perspective view of the actuating unit in an unactuated position, and FIG. 6 shows the view of the actuating unit in an activated position.

FIG. 1 shows an exemplary embodiment of a handle device 1 according to the present invention in a floating view. The components of the handle device 1 are reproduced in an arrangement in which each is shown in front of another with the installation sequence being substantially maintained such that the manner in which the handle device 1 is fitted is clear. The door 11 of a vehicle, which door, indicated schematically, is reproduced by a door opening 30, serves as the means of receiving the handle device 1. The handle device 1 is fitted onto said door opening 30 and is therefore arranged so as to be held on the door 11. It is therefore described below how and which components are fitted to one another and in relation to one another from the outer side of the door 11 and how and which components are fitted to one another and in relation to one another from the inner side of the door 11.

The components illustrated in front of the door 11 are fitted from the outer side whereas the components illustrated behind the door 11 are fitted from the inner side. First of all, a handle part 10 can be accommodated pivotably in a handle shell 19, wherein the connection between the handle part 10 and the handle shell 19 can be produced by a pivoting spindle element 31. A receiving fork 32 is located on the handle shell 19 and an articulated section 33 of the handle part 10 can be received between the receiving fork 32 and bolted to the pivoting spindle element 31.

The handle part 10 is therefore accommodated pivotably in the handle shell 19. Consequently a first module is created, which module can be handled individually as a structural unit and can be placed onto the door 11 from the outer side.

In order to create the second, individually handleable module, a handle mount 17 is provided, the handle mount serving as a basic structure of the handle device 1 and being arrangeable from the inner side against the door opening 30 of the door 11. An actuating element 15 which forms part of the actuating unit 12 is fitted on the door mount 17. The actuating element 15 is installed via cylinder pins 34 which are introduced into bores or receptacles present in the handle mount 17. The actuating element 15 has a fork shape, and therefore the fork ends of the actuating element 15 are held by the cylinder pins 34 on the handle mount 17. As a result, the actuating element 15 is pivotable about a pivot axis 18 which is formed at the same time by the respective longitudinal extent of the cylinder pins 34. The actuating element 15 is prestressed by a spring element 35 into a position which reproduces the rest position of the actuating unit 12. In this case, the spring element 35 can be arranged in such a manner that said spring element surrounds the cylinder pin 34 illustrated on the bottom side.

Furthermore, a locking cylinder 14 is shown, the locking cylinder being able to be inserted into the handle mount 17 and being fastened captively in the handle mount 17 by a clamping disk 36. Furthermore, a blocking element 28 is shown, the blocking element being connected to the actuating element 15 such that the connection is formed at a distance from the pivot axis 18. If the actuating element 15 is pivoted about the pivot axis 18 by manual actuation, the blocking element 28, preferably designed as a wire or rod element, executes a movement on a movement axis 37.

The blocking element 28 serves both to lock, unlock and also to deploy the handle part 10 from the rest position into the operating position. At the same time, the blocking element 28 forms a crash interlock by means of the locking function, and therefore the blocking element 28 prevents the handle part 10 from being able to pass from the rest position into the operating position if acceleration forces act on the handle part 10. For example, in the event of an accident, an acceleration force can act on the handle part 10, the acceleration force sufficing in order to transfer the handle part from the rest position into the operating position. By means of the arrangement of the blocking element 28 preferably in such a manner that a form-fitting connection is produced between the handle part 10 and the handle mount 17, the handle part can be transferred into the operating position exclusively when the actuating element 15 of the actuating unit 12 is activated. The activation takes place here by the actuating element 15 pivoting about the pivot axis 18. Only then is the form-fitting connection between the handle part 10 and the handle mount 17 released, owing to a movement of the blocking element 28 in the direction of the movement axis 37, such that only then can the handle part 10 be moved. As a result, a permanent crash interlock is produced for the handle part 10, said crash interlock being released exclusively when the actuating unit 12 is activated.

If the handle mount 17 is premanufactured with the abovementioned components, this can form the second module which is screwed against the first module through the door opening 30. For this purpose, a screw element can be passed through a screw opening 38 and screwed into the handle mount. The first module is therefore screwed against the second module and the handle device 1 is arranged fixedly on the door 11. A further cover 39 can then be arranged on the handle part 10, wherein, in a development, a light-generating unit 40 can be provided, which unit can be inserted into the cover 39 in order to provide outside illumination of the vehicle and/or to supply a position light for the handle device 1.

FIG. 2 shows a perspective view of the handle device 1 which is installed in the door 11 of a vehicle. The handle shell 19, in which the handle part 10 lies, can be seen here in the form of the outer edge, wherein the cover 39 can be seen from the outside and together with the cover 13 of the actuating unit ends flush with the door 11. The covers 13 and 39 end flush with a simultaneously flush transition of the edge formed by the handle shell 19. As a result, the handle device 1 is integrated into the outer skin of the door 11 without a step, a protruding part or a geometrically set-back arrangement of the handle device 1 being formed. In particular, a recessed grip, by means of which manual enclosing of the handle part 10 of the handle device 1 would be possible, is not present. In order to operate the handle device 1, first of all the cover 13 has to be pressed manually such that the latter pivots in the direction of the cover 39. As a result, by means of displacement of the blocking element 28 on the movement axis 37, the form-fitting connection between the handle part 10 and the handle mount 17 is released to an extent such that the handle part 10 can rotate about the pivoting spindle element 31 in the receiving fork 32 of the handle shell 19. In the process, the handle part 10 passes into an operating position which is shown in FIG. 3 below.

FIG. 3 shows the perspective view of the handle device 1 according to FIG. 2, wherein the handle part 10 is illustrated in the operating position. The cover 13 is shown in the pivoted arrangement, and therefore, by means of the arrangement according to the invention, the locking cylinder 14 appears. Furthermore, the handle shell 19 is shown, it being possible to see that the latter has a trough into which the handle part 10 can be placed flush when said handle part is in the rest position.

FIG. 4 shows, in a perspective view, the handle mount 17, the handle shell 19 and the handle part 10 which is fitted in the handle shell 19 and has the cover 39 fitted on the front side. The cover 13 is shown on the front side, said covers being connected to each other after the module, based on the handle mount 17, and the module, based on the handle shell 19 with the handle part 10, are fitted together. The actuating element 15 is placed in the handle mount 17 such that, when the handle mount 17 is installed on the handle shell 19, a receiving extension 16 of the actuating element 15 extends through the opening 41 provided in the handle shell 19. Furthermore, the blocking element 28 is illustrated in the arrangement thereof in the handle mount 17, the blocking element moving along the movement axis 37 when the actuating element 15 is moved by manual pressure on the cover 13 which is fitted onto the receiving extension 16. The spring element 29 is designed as a double leg spring and can come to bear with a bridge section 29*a* against the handle part 10, preferably against the receiving fork 32 of the handle part 10. By means of the spring element 29, the handle part 10 is prestressed in the direction of the rest position, and therefore the handle part 10 has to be transferred from the rest position into the operating position counter to the prestress of the spring element 29 by the actuating unit 12 being actuated and by the blocking element 28 executing a displacement in the direction of the movement axis 37. In the process, not only is a form-fitting connection, which is produced by the blocking element 28, between the handle part 10 and the handle mount 17 released but the blocking element additionally presses the handle part 10 into the operating position counter to the prestress of the spring element 29.

FIGS. 5 and 6 show the actuating unit 12 in a perspective side view, wherein the locking cylinder 14 is accommodated in the fork-shaped design of the actuating element 15. FIG. 5 shows the rest position of the actuating unit 12 whereas FIG. 6 shows the position after the cover 13 is pivoted by manual pressing and the handle part 10 can subsequently be pivoted in the arrow direction shown. The actuating element 15 is accommodated in the handle mount 17 via cylinder pins 34, an individual cylinder pin 34 only being indicated on the front side. The blocking element 28, which is of rod-like design, is coupled via a receiving slot 44 which is arranged at a distance from the pivot axis 18, which is reproduced by the cylinder pin 34. If the actuating element 15 pivots in the arrow direction shown, the blocking element 28 moves in the direction of the movement axis 37. At the same time, the locking cylinder 14 is at least partially released with respect to the outer side of the handle device. The release can be carried out to an extent such that a key can already be introduced into the locking channel of the locking cylinder 14, wherein, in a further step, the cover 13 may need to be released from the actuating element 15 in order actually to actuate the locking cylinder 14 with a key. Furthermore, the clamping disk 36, with which the locking cylinder 14 is fixed in the handle mount 17—not illustrated specifically in FIGS. 5 and 6, is shown.

The invention is not restricted in the design thereof to the above-stated preferred exemplary embodiment. On the contrary, a number of alternatives making use of the solution illustrated in fundamentally different types of embodiments is also conceivable. All of the features and/or advantages revealed in the claims, the description or the drawings, including structural details, three-dimensional arrangements and method steps, may be essential to the invention both by themselves and in very different combinations.

LIST OF DESIGNATIONS

1 Handle device
10 Handle part
11 Door
12 Actuating unit
13 Cover
14 Locking cylinder
15 Actuating element
16 Receiving extension
17 Handle mount
18 Pivot axis
19 Handle shell
28 Blocking element
29 Spring element
29*a* Bridge section
30 Door opening
31 Pivoting spindle element
32 Receiving fork
33 Articulated section
34 Cylinder pin
35 Spring element
36 Clamping disk
37 Movement axis
38 Screw opening
39 Cover

40 Light-generating unit
41 Opening
44 Receiving slot

The invention claimed is:

1. A handle device including a locking device for a vehicle, said handle device comprising:

a handle part movably mountable with respect to a door of the vehicle and movable between a rest position and an operating position, wherein, in the rest position, the handle part is arranged flush with an outer side of the door and, in the operating position, the handle part protrudes out of the outer side of the door and is manually operable to open the door;

an actuating unit for moving the handle part from the rest position into the operating position, the actuating unit including a cover arranged flush with the outer side of the door, and a spring element configured to bias the actuating unit toward the rest position; and a locking cylinder arranged in the handle device in such a manner that the cover of the actuating unit-conceals the locking cylinder with respect to the outer side of the door in the rest position and at least partially releases the locking cylinder upon manual actuation.

2. The handle device as claimed in claim 1, in which the cover is pivotable in the handle device such that, upon manual actuation of the actuating unit, the cover pivots away laterally with respect to the locking cylinder.

3. The handle device as claimed in claim 1, further comprising a handle shell with an elongate extent that lies flush with a likewise elongate extent of the handle part at least in the rest position, the actuating unit being arranged as an extension of the elongate extent of the handle part.

4. The handle device as claimed in claim 1, in which the actuating unit pivots the cover under the handle part upon actuation.

5. The handle device as claimed in claim 1, in which the actuating unit has an actuating element to pivot the actuating unit about a pivot axis, and the cover is arranged on the actuating element.

6. The handle device as claimed in claim 1, further comprising a blocking element operatively connected to the actuating unit in such a manner that the blocking element is movable between a locking position and a release position by the actuating unit, the blocking element being transferred from the locking position into a release position to move the handle part from the rest position.

7. The handle device as claimed in claim 6, in which movement of the handle part is permitted when the blocking elements is in the release position and movement of the handle part is blocked when the blocking elements is in the locking position to prevent an unintentional opening of the door.

8. The handle device as claimed in claim 6, in which, in the locking position, the blocking element adopts a first position and engages in a form-fitting manner in the handle part, and, during displacement to the release position, the blocking element moving into a second position acting on the handle part in such a manner that the handle part moves from the rest position into the operating position.

9. The handle device as claimed in claim 1, further including a handle mount arranged within the door, and an actuating element pivotably mounted on a pivot axis in the handle mount to pivot the actuating unit.

10. The handle device as claimed in claim 9, in which the handle mount has at least one bearing arrangement configured to receive at least one cylinder pin for pivoting the actuating element, and wherein the pivot axis is formed by the at least one cylinder pin and extends one of through the locking cylinder and adjacent to the locking cylinder.

11. The handle device as claimed in claim 6, in which the actuating element has a receiving slot for coupling the blocking element to the actuating unit, and, during the pivoting of the actuating element, the receiving slot is displaced along an axis relative to the handle part.

12. The handle device as claimed in claim 1, in which the actuating element has a receiving extension and the cover is arranged on the actuating element through the receiving extension, the handle device comprises a handle shell arranged on the outer side of the door, and the receiving extension extends through an opening in the handle shell.

13. The handle device as claimed in claim 1, further comprising a spring element configured to prestress the actuating element in such a manner that the actuating unit is biased toward an unactuated state in which the cover is arranged flush with the outer side of the door and conceals the locking cylinder.

14. The handle device as claimed in claim 1, in which the cover is arranged releasably on the actuating element.

15. The handle device as claimed in claim 1, in which the the cover is coupled over the locking cylinder and configured in such a manner that the cover is detachable from the actuating element to enable a key to be introduced to release the locking cylinder.

16. The handle device as claimed in claim 1, in which the arrangement of the cover on the actuating element includes a releasable connection which can be released by a tool.

17. A method for actuating a handle device including a locking device in a vehicle, the handle device including a locking cylinder and a handle part mounted movably with respect to a door of the vehicle that is movable between a rest position in which the handle part is flush with respect to an outer side of the door and an operating position in which the handle part protrudes out of the outer side of the door, wherein the handle part is operable manually to open the door comprising the steps of moving a blocking element into a release position to enable movement of the handle part, moving an actuating unit to transfer the handle part at least from the rest position in which the locking cylinder is concealed with respect to the outer side of the door into the operating position to at least partially release the locking cylinder.

18. The method as claimed in claim 17, further comprising the step of pivoting the actuating unit about a pivot axis in order to transfer the handle part at least from the rest position into the operating position.

* * * * *

UNITED STATES PATENT AND TRADEMARK OFFICE

CERTIFICATE OF CORRECTION

PATENT NO. : 8,991,227 B2
APPLICATION NO. : 13/502694
DATED : March 31, 2015
INVENTOR(S) : Dirk Muller et al.

It is certified that error appears in the above-identified patent and that said Letters Patent is hereby corrected as shown below:

In the Specification

Column 6, line 54
“part can be” should be --part 10 can be--

Column 8, line 5
“element additionally” should be --element 28 additionally--

In the Claims

Column 10, lines 31 and 32
“the the” should be --the--

Signed and Sealed this
Twenty-ninth Day of September, 2015

Michelle K. Lee

Michelle K. Lee
*Director of the United States Patent and Trademark Office*